United States Patent [19]

Watanabe et al.

[11] Patent Number: 4,771,964

[45] Date of Patent: Sep. 20, 1988

[54] FISHING REEL

[75] Inventors: Masaru Watanabe; Hiroshi Ohtake, both of Ashikaga, Japan

[73] Assignee: Copal Electronics Co. Ltd., Tokyo, Japan

[21] Appl. No.: 79,156

[22] Filed: Jul. 29, 1987

[30] Foreign Application Priority Data

Jul. 29, 1986 [JP] Japan .................................. 61-178274
Mar. 6, 1987 [JP] Japan .................................. 62-052351

[51] Int. Cl.$^4$ ............................................. A01K 89/00
[52] U.S. Cl. .......................... 242/84.1 A; 242/84.1 K; 242/84.41; 242/211; 43/21
[58] Field of Search ...................... 242/84.1 A, 84.1 K, 242/84.41, 84.42, 211, 212, 215, 217; 43/21

[56] References Cited

U.S. PATENT DOCUMENTS

| | | | |
|---|---|---|---|
| 728,717 | 5/1903 | Hunter | 242/213 |
| 1,145,038 | 7/1915 | Schramm | 242/213 |
| 1,580,986 | 4/1926 | Aberson | 242/84.1 A |
| 2,380,670 | 7/1945 | Nelson | 242/84.42 X |
| 2,446,354 | 8/1948 | Wolfe | 242/221 |
| 2,600,774 | 6/1952 | Hard et al. | 242/84.42 |
| 2,641,417 | 6/1953 | Kinsey | 242/84.42 |
| 2,760,736 | 8/1956 | Mihalko et al. | 242/212 X |
| 3,017,134 | 1/1962 | Duvall | 242/211 X |
| 3,111,287 | 11/1963 | Baenziger . | |
| 3,220,667 | 11/1965 | Madsen | 242/84.1 A X |
| 3,409,245 | 11/1968 | Grace | 242/84.1 A |
| 3,460,778 | 8/1969 | Folbrecht | 242/84.1 A |
| 3,669,378 | 6/1972 | Miyamae | 242/84.1 A |
| 3,796,395 | 3/1974 | Rankin | 242/212 |
| 4,283,025 | 8/1981 | Whisenhunt | 242/84.1 A |
| 4,327,880 | 5/1982 | Dörbandt | 242/84.2 R |
| 4,512,536 | 4/1985 | Sato . | |
| 4,513,930 | 4/1985 | Sato . | |
| 4,522,354 | 6/1985 | Sato et al. | 242/219 |
| 4,557,429 | 12/1985 | Atobe . | |
| 4,598,878 | 7/1986 | Steffan | 242/84.1 A |

FOREIGN PATENT DOCUMENTS

| | | | |
|---|---|---|---|
| 71866 | 6/1916 | Austria | 242/217 |
| 671216 | 2/1939 | Fed. Rep. of Germany | 242/84.42 |
| 47-19008 | 5/1972 | Japan . | |
| 47-21452 | 6/1972 | Japan . | |
| 50-26790 | 8/1975 | Japan . | |
| 60-43325 | 3/1985 | Japan . | |
| 60-54629 | 3/1985 | Japan . | |
| 11036 | of 1904 | United Kingdom | 242/84.42 |

Primary Examiner—Stuart S. Levy
Assistant Examiner—Steven M. DuBois
Attorney, Agent, or Firm—Wenderoth, Lind & Ponack

[57] ABSTRACT

A fishing reel equipped with a motor case in which a motor for driving a spool and a level winder driving mechanism are accommodated. The motor case is provided with a driving shaft cylinder in which is accommodated a driving shaft and on which is mounted a bearing supporting a spool wall, the driving shaft and a driving shaft cylinder being shiftable into the spool cylinder arranged in a hole defined in the side plate, with an annular cylinder having projection on the circumferential surface thereof, the projections being slidably engageable with slits defined in the inner wall of the side plate when the annular cylinder is fitted to a hole defined in the side plate, with a cylindrical projection supporting a level winder driving gear therein, which is shiftably engaged with a groove defined in the side plate, with a slit defined therein along which is slidable a projection button shiftably arranged in a hole defined in the side plate and protruding from the surface of the side plate by means of biasing force of a coil spring arranged in the hole and with a button slidably positioned through a hole defined in the motor case. The motor case is attached to or detached from the fishing reel housing by means of the slidable movement of projection button through the hole defined in the inner plate of the housing and the slidable movement of the sliding button through the hole defined in the motor case.

5 Claims, 5 Drawing Sheets

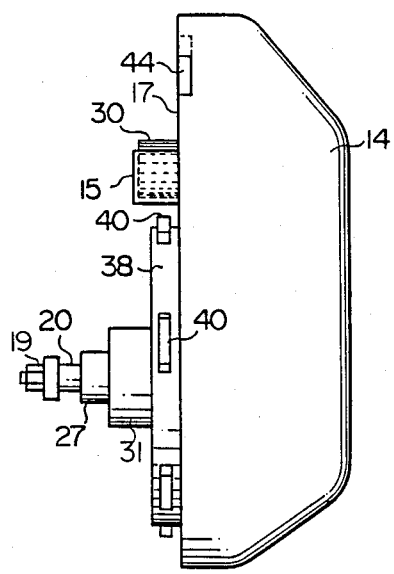
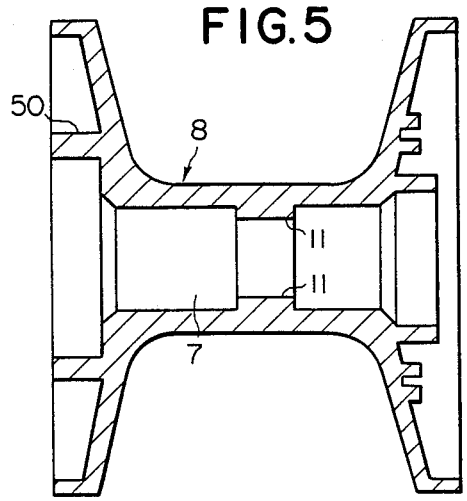

4,771,964

FISHING REEL

BACKGROUND OF THE INVENTION

This invention relates to a motor driven double-bearing fishing reel, more specifically to a motor removably attached to a housing of a fishing reel.

A conventional fishing reel of this type is driven by a motor accommodated in a housing in parallel with a spool shaft on which a spool is mounted and with a transmission mechanism arranged between the motor and the spool shaft. The rotation of the motor is usually transmitted via the transmission mechanism to the spool shaft to be rotated therewith.

However, in order to cope with a situation wherein a proper motor power or speed is needed, for instance, corresponding to the kind of fish to be caught, it is necessary to prepare so many fishing reels as equipped with motors with a variety of power and speed to hereby meet the requirement with the result that a considerably big stock of fishing reel of various capacity of motors must be kept ready for meeting the demand.

In the same conventional fishing reel, it is also devised that a motor of any chosen power or speed may be replaced by disassembling and assembling the fishing reel, which requires an extra man power hereby to give an operator of fishing reel a considerable inconvenience.

One more conventional fishing reel of this type has a motor accommodated in a spool cylinder thereby to drive the spool and the rotating speed of the spool is controllable by means of a control means such as a control level. This fishing reel also involves the same drawbacks as mentioned in the preceding case in line with replacement of motors.

Another conventional fishing reel of this type is provided with a motor which is independently arranged outside the housing of fishing reel to which a motor is electrically connected by a lead wire. The fishing reel thus constructed is so bulky and complicated that it is very inconvenient for an operator to handle and to carry.

SUMMARY OF THE INVENTION

An object of the present invention is to overcome the drawbacks of conventional fishing reel by presenting a device whereby a motor of any desired power may easily be replaced.

Another object of this invention is to eliminate complicated disassembling and assembling processes when the motor of any desired power or speed is replaced in order to meet anglers' requirements.

The object of this invention may be attained by a fishing reel which is provided with a motor case in which a motor is accommodated and which is easily attachable to or detachable from a side plate of fishing reel housing whereby any motor of desired power or speed may be assembled to the fishing reel by one operation.

The above and further objects and novel features of the invention will be more fully understood from the following detailed description when the same is read in connection with the accompanying drawings.

BRIEF DESCRIPTION OF THE DRAWINGS

FIG. 3 is a side elevation of FIG. 1.

FIG. 5 illustrates a sectional view of a spool adopted by the present invention.

DETAILED DESCRIPTION OF THE INVENTION

An embodiment of the present invention will now be described with reference to the drawings.

Figure 6:
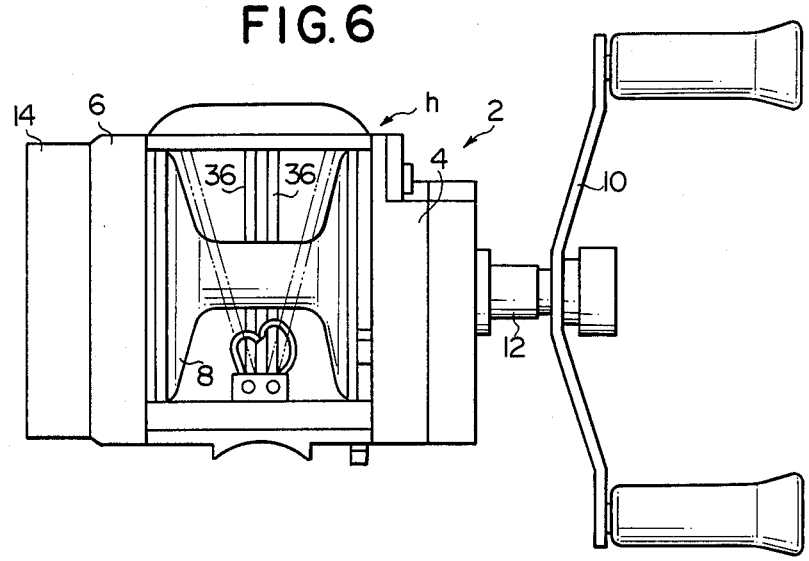
FIG. 6 is a side elevation of a fishing reel according to this invention.
Figure 7:
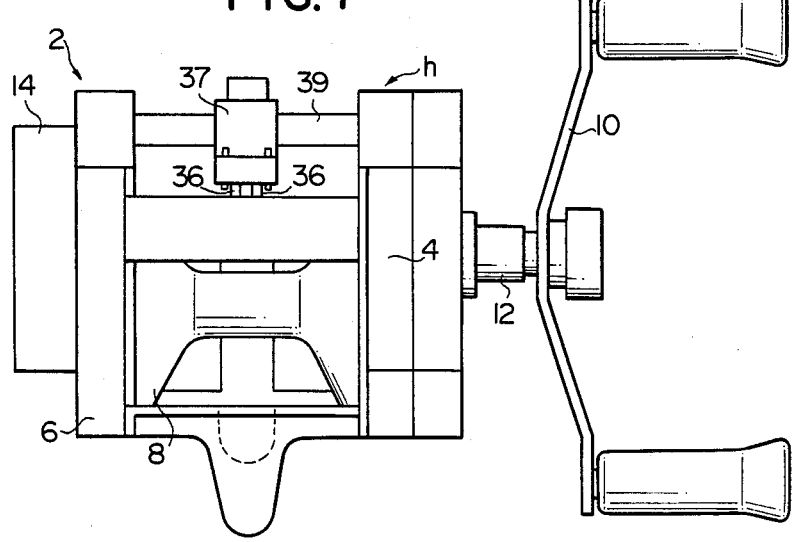
FIG. 7 is a top plan view of FIG. 6.
Figure 8:
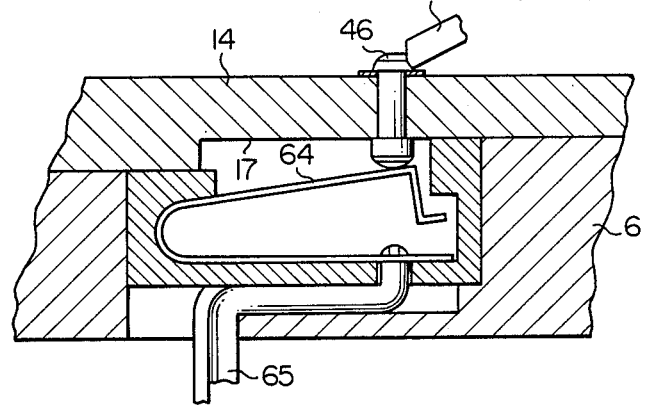
FIG. 8 illustrates an enlarged sectional view of a contact means.
Figure 9:
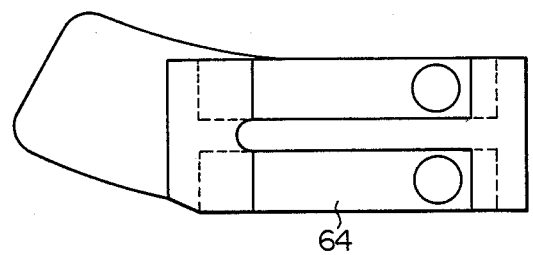
FIG. 9 is a plan view of a leaf spring of contact means.

A fishing reel provided with a motor adopted by the present invention will now be explained with particular reference to FIGS. 4, 5 and 6.

In a fishing reel generally designated by 2, a spool shaft 9 on which a spool 8 having a spool cylinder 7 is rotatably mounted is supported on a side plates 4 of a housing h.

The spool shaft 9 is provided at its end with a spool gear (not shown) which is meshable with a drive gear (not shown) on a handle shaft 12 connected to a handle 10. With the operation of the handle 10, the spool 8 may be rotatable with the handle shaft 12 via the drive gear, the spool gear and the spool shaft 9.

A motor 13 according to this invention which is accommodated in a motor case 14 is removably attached to a side plate 6 of the fishing reel housing h.

A motor shaft 16 of the motor 13 accommodated in the case 14 is provided with a pinion 18 meshable with a spool inner gear 26 which is fixedly mounted on a driving shaft cylinder 22. The spool inner gear 26 is also fixedly mounted on an spool inner gear holder 24 which is in turn fitted to the driving shaft cylinder 22.

The driving shaft cylinder 22 has a chamber in which a driving shaft 20 may be accommodated. A pair of projections 21 formed at the end of the driving shaft cylinder 22 are engageable with a pair of slits 20a and 20b defined in the driving shaft 20.

The driving shaft 20 is also provided with a head projection 19 at the end thereof while the other end is connected to a coil spring holder 25 fitted to the spool inner gear holder 24, via a coil spring 23 spanning the driving shaft 20 and the coil spring holder 25 therebetween. With the actuation of the motor 13, the spool inner gear 26, the spool inner gear holder 24 and the driving shaft 22 may be rotated thereby the engagement between the pair of driving shaft cylinder projections 21 and the pair of slits 20a and 20b is released with the result that the driving shaft 20 is shifted toward left, facing to FIG. 4, and the head projection 19 may be engaged with the projection 11 of the spool cylinder 7 whereby the spool 8 may be rotatable with the driving shaft 20 when driven by the motor 13 accommodated in the case 14.

The driving shaft cylinder 22 is rotatably supported by a spool holder 27 via a pair of bearing 27a and 27b while an annular wall 50 of the spool 8 is positioned on a bearing 31 mounted rotatably on the spool holder 27.

Figure 4:
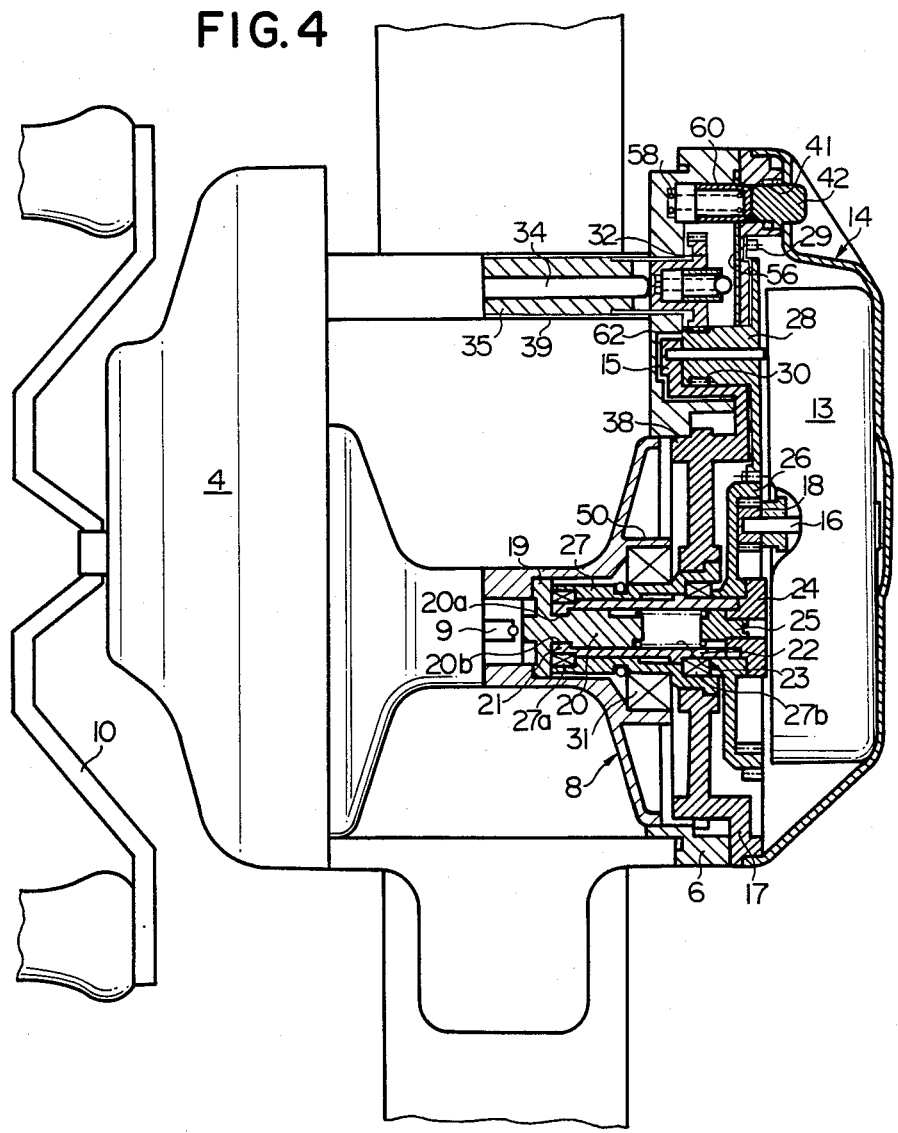
FIG. 4 is an enlarged partially vertical section view according to this invention.

A level winder driving mechanism is now explained referring to FIG. 4. A first gear tooth 29 of a level winder driving gear 28 is meshing with the inner spool gear 26 while a second gear tooth 30 thereof, with a level winder gear 32 which is engageable with a traverse cam shaft 34. With the rotation of the spool inner gear 26, the transverse cam shaft 34 is rotated to a predetermined direction together with a traverse cam cylinder 39 via the level winder driving gear 28 and the level winder gear 32 thereby a level winder guide means 37 mounted on the traverse cam cylinder 39 and engaged with a traverse cam 35 is shifted reciprocally along the traverse cam cylinder 39 in lateral directions.

Figure 1:
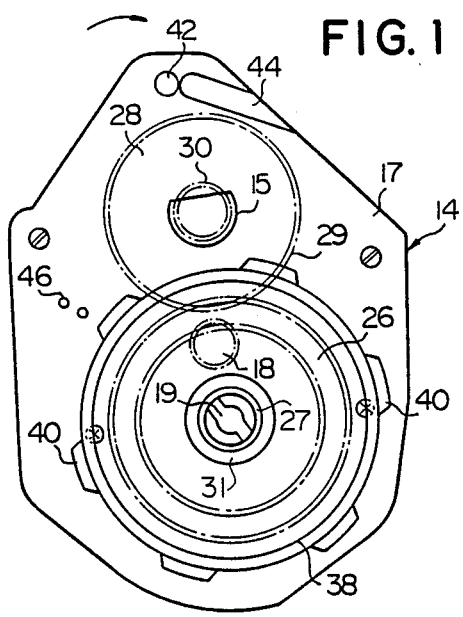
FIG. 1 illustrates a plan view of a motor case according to this invention.

A motor case 14 is as best shown in FIG. 1. The motor 13 and other related parts are accommodated in the motor case 14 which is preferably of a watertight materials such as plastics. The other related parts may include the spool inner gear 26 supported by the spool inner gear holder 24, the pinion 18 mounted on the motor shaft 16, the coil spring holder 25, the driving shaft cylinder 22 in which the driving shaft 20 is accommodated and the level winder driving gear 28 accomodated in a cylindrical projection 15 integrally formed with the case 14.

On the inner wall 17 of the case 14 is arranged a annular cylinder 38 on the circumferential surface of which are disposed a plurality of projection 40. A button 42 which is shiftable in and out of a through hole 41 disposed in the case 14 is positioned at the end thereof. A narrow slit 44 which may receive a projection button 60 to be described in detail hereinafter is arranged in the case 14 adjacent to the button 42.

Numeral 46 is a pair of contact projections connected to a pair of lead wire 47 for the motor 13 respectively, which is slidably touchable respectively on a pair of leaf springs 64 arranged on the side plate 6 which will be explained in detail hereinafter.

Figure 2:
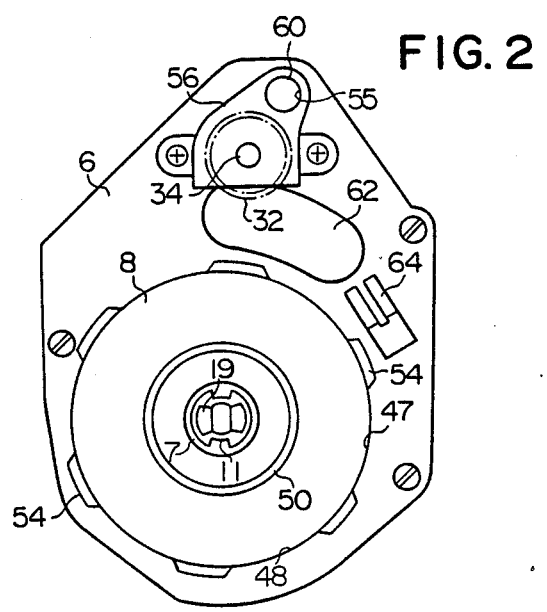
FIG. 2 is a plan view of a side plate of a fishing reel housing.

FIG. 2 illustrates a plan view of the side plate 6. The spool 8 provided with a cylinder 7 having an annular projection 50 is rotatably positioned in an annular hole 48 defined in the side plate 6. A plurality of slits 54 which are engageable with the projection 40 disposed on the annular cylinder 38 of the motor case 14 are defined in the annular hole 48.

A cover plate 56 fitted to the side plate 6 and arranged to cover the level winder gear 32 has a hole 55 through which bayonet type projection button 60 is shiftably held by means of a coil spring 58, the head of the projection button 60 being positioned protrudingly from the surface of the side plate 6.

Numeral 62 is a groove with which the cylindrical projection 15 arranged on the inner wall 17 of the motor case 14 is engageable. Numeral 64 is a pair of contacts leaf springs on which the pair of contact projection 46 may slidingly contact. The pair of contact leaf springs 64 positioned in the side plate 6 is connected respectively to a pair of lead wires 65 for power sources such as electric batteries.

The process of assembling the motor case 14 with the side plate 6 is now described.

Firstly, whenever the inner wall 17 of the motor case 14 is placed onto the side plate 6 of the fishing reel housing h for assembling, the projections 40 arranged around the annular cylinder 39 may slidably fit into the slits 54 defined in the annular hole 49 while the driving shaft cylinder 22 and the driving shaft 20 may be shifted into the spool cylinder 7 and at the same time the cylindrical projection 15 supporting the level winder driving gear 28 therein is shifted into the groove 62 defined in the side plate 6.

Then by turning the motor case 14 to a direction shown by an arrow, the projection button 60 protruding from the side plate 6 by means of the coil spring 58 is slidably engaged with the groove 44 defined in the inner wall 17 of the motor case 14 and is finally disengaged therewith to hereby slide into the hole 41 to push the button 42 in such a way that the head of button 42 is partially protruded from the motor case 14 whereby the motor case 14 is watertightly attached to the housing h of the fishing reel 2. Whenever the motor case 14 is thus attached to the fishing reel housing h, the pair of projection buttons 46 touches on the pair of contact leaf springs 64 respectively thereby the motor 13 becomes electrically connectable with the power sources. The motor 13 is electrically driven by means of an actuation of a switch (not shown).

When detaching the motor case 14 from the fishing reel housing h, the sliding button 42 which is partially protruding from the motor case 14 is pushed onto the projection button 60 thereby the projection button 60 is retracted. And by turning the motor case 14 to an opposite direction of the arrow the projection button 60 is shifted to be engaged with the groove 44 until the engagement is released.

Thus the attachment or detachment of the motor case may be performed smoothly and quickly by one operation.

What we claim is:

1. In a fishing reel having a housing to which is removably attached a motor case in which a motor equipped with a driving mechanism for driving a spool and a level winder mechanism are accommodated, the motor case comprises:

an annular cylinder arranged thereon;
   a plurality of projections arranged around the annular cylinder, the cylinder and the projections being engageable respectively with a first hole and grooves defined in a side plate of the housing;
   a driving shaft cylinder having a driving shaft accommodated therein and a bearing mounted thereon, which is protruded from the inner wall of the motor case and is shiftable into the spool cylinder with the bearing sitting on an annular wall thereof;
   a cylindrical projection supporting a level winder driving gear therein, the cylindrical projection being engageable with a groove defined in the side plate of the housing;
   a slit in the motor case with which a projection button disposed protrudably in a second hole defined in the side plate is engaged with the motor case is pushed onto the side plate of the housing; and,
   a second button slidable in and out of a third hole defined in the motor case, one end thereof being partially slide out of the third hole as soon as the projection button touches thereon when the motor case is rotated to a determined direction, whereby the motor case is attached to the housing by one operation.

2. A fishing reel as claimed in claim 1, wherein a pair of contact buttons arranged on an inner wall of the motor case makes slidable contact with a pair of contact leaf springs respectively arranged in the side plate of the housing thereby the motor and a power source become electrically connectable.

3. A fishing reel as claimed in claim 1, wherein the projection button slidably arranged in the second hole defined in the side plate is shifted out of the hole by means of a coil spring positioned in the hole toward the motor case.

4. A fishing reel as claimed in claim 1, wherein one end of the second button is partially slid out of the third hole by means of a biasing force of the projection button touching thereon.

5. A fishing reel as claimed in claim 4, wherein one end of the second button partially protruded out of the third hole defined in the motor case is pushed onto the end of the projection button arranged in the second hole defined in the side plate to permit the projection button to be shifted to engage with the slit defined in the motor case and to slide therealong corresponding to the rotation of the motor case to a determined direction thereby the motor case is detached from the housing.

* * * * *